Patented June 12, 1934

1,962,601

UNITED STATES PATENT OFFICE 1,962,601

PROCESS FOR PRINTING ANIMAL FIBERS AND PRODUCT THEREFROM

Jean Gottlieb Kundert, Wattwil, Switzerland, assignor to Heberlein & Co. A. G., Wattwil, Switzerland, a corporation of Switzerland No Drawing. Application May 5, 1932, Serial No. 609,492. In Germany January 21, 1929

7 Claims. (Cl. 8—5)

This invention relates to a process for printing animal fibers, more particularly to printing such material with vat dyestuffs. The invention also relates to products resulting from such process.

This application is a continuation in part of my copending application Ser. No. 420,631, filed January 13, 1930.

Heretofore very poor results have been obtained in the printing of animal fibers with fast vat dyestuffs. Water soluble esterified vat dyestuffs of the indigo and anthraquinone series found in the trade under the designation "Indigosols" and "Leucosols" have been employed for dyeing and printing of cotton. They have also been proposed for wool and silk but have not yet attained any importance, and have never practically been used.

For this purpose a steaming process was recommended according to which Indigosols or Leucosols printed with an oxidation agent were fixed when subsequently steamed.

The above process has, however, not been capable of producing printed wool products which were fast under standard tests to washing, light, perspiration and other well-known testing agents.

The principal object of the present invention accordingly is to overcome disadvantages of the previous processes and to provide a simple economical printing process, which will produce a series of products consisting of or containing animal fibers, printed with such vat dyes and which are substantially fast to the various agents employed for testing such fastness.

The invention comprises the novel products as well as the novel processes and steps of processes according to which such products are manufactured, the specific embodiments of which are described hereinafter by way of example and in accordance with which I now prefer to practice the invention.

It has been found according to the present invention that the Indigosols and Leucosols can be printed to produce fast products when such printing is carried on employing an oxidizing agent such as a nitrite in the presence of an agent for promoting the solution of the dye, with a steaming of the printed material at about 100° C. for a short time and subsequent development of the dye on the fiber. This development may be accomplished by passing the printed materials, after the steaming, through a dilute acid-containing bath whereby the dye is developed and fixed. After the passage through the acid the goods are washed, rinsed and may then be subjected to further final oxidation treatment whereupon they are washed, soaked, rinsed and dried.

The new process involves a simplifying and cheapening of the working steps and a saving of the animal fiber is secured. Aside from wool and silk, other animal fibers may be treated by the process. The printing process is particularly useful for fabrics but it may also be used on yarns, slivers and the like. In carrying out the process in its preferred form, I prepare a suitable composition to be applied by printing. The following are examples of such compositions. It is to be understood that these examples are to be interpreted as illustrative only, and the invention is not to be restricted thereto:—

Printing compositions

*Example 1.*—The printing color is made up of the following:

60 grams coloring matter
200 grams water
100 grams pyridine base
50 grams glycerine
500 grams starch tragacanth thickening
50 grams sodium nitrite ⎫
10 grams ammonia       ⎬ dissolved separately.
30 grams water          ⎭

*Example 2.*—The printing color is made up of the following:

100 grams coloring matter
100 grams alcoholic solution of phenol containing two parts of phenol ($C_6H_5OH$) dissolved in three parts of alcohol
50 grams glycerine
190 grams water
520 grams starch tragacanth thickening
30 grams sodium nitrite
10 grams sodium carbonate.

*Example 3.*—The printing color is made up of the following:

40 grams coloring matter
150 grams acetine
240 grams water
520 grams starch tragacanth thickening
30 grams sodium nitrite
10 grams sodium carbonate.

The coloring matter indicated in the above examples is in each instance an esterified vat dyestuff. Examples of such dyestuffs are as follows:—

Indigosol rose JR extra
Indigosol green JB
Indigosol red-violet JRH
Indigosol scarlet HB
Indigosol O (Colour Index No. 1178).

The above dyestuffs have no index numbers. They are mentioned in the Dyestuff Tabulation of Schultz, Vol. II of 1932, page 133.

In preparing starch tragacanth thickening, 100 grams of wheat starch, 500 grams of water and 400 grams of a water solution of gum tragacanth in the proportion of one part of gum tragacanth to ten of water are mixed. The materials pyridine base, alcoholic solution of phenol and acetine are agents for promoting the solution of the esterified dyestuffs in water.

The compositions so prepared are printed on animal fiber. Wool muslin is pretreated in the usual manner, i. e. soaped, chlorinated and bleached with bisulfite and dried, prior to drying the fabrics being sheared on the right side, brushed, passed through an equalizing tenter frame and rolled up. The so-treated wool muslin is treated with one of the mixtures given above and the printed fabric is then steamed for approximately 7 minutes in a fast steamer of the type commonly known as a Mather-Platt steamer with wet steam at approximately 99–100° C. After steaming the print is developed by passing the cloth in extended state through a small open vat containing a bath of 50 grams of sulfuric acid of 50° Bé. per liter of water. The bath is maintained at approximately 95° C. The period of passage through the bath is approximately 2 minutes. After this passage, rinsing and final washing occur. After this washing process, an after-treatment in the dye vat for final oxidation of the coloring matter, is preferably carried on. The vat is provided for this purpose with a bath of 1½ grams of sodium persulphate, plus 2 grams of sulfuric acid of 2° Bé. per liter. The temperature of the bath is maintained at approximately 35–40° C. The period of passage through the bath is about 20 minutes. Thereafter the material is preferably washed and soaped at 50° C., rinsed and dried.

The animal fiber prints made in accordance with the invention, following the procedures above set forth, possess properties which easily distinguish them from prints made in accordance with prior processes. These properties are observable upon subjecting samples of prints made according to the present invention and prints according to prior procedures to tests for fastness to light, perspiration, washing and immersion in water. When subjected to standard tests of this kind, the samples made according to the present invention show little or no change, while samples made according to other prior processes exhibit noticeable changes. In making this comparison, samples were made up by printing according to Example 1 on wool, following the procedure above given. A similar set of samples was prepared in accordance with the following procedure:—

The woolen fabrics pretreated in the usual manner as stated above are printed with suitable acid dyestuffs.

The printing color is made up of the following:

30 grams acid dyestuff
    50 grams glycerine
   300 grams water
   550 grams gum arabic thickening 3 : 2
    20 grams oxalic acid.

The so printed wool muslins were then steamed for approximately one hour in a steaming chamber and then washed in the usual manner and dried.

The samples so prepared were subjected to tests for fastness to light, perspiration, washing and rubbing. Samples were also subjected to immersion in water and the ironing tests, all of these tests being in accordance with the booklet entitled "German Fastness Commission", edition of 1928.

The results of these tests show that the samples prepared according to the present invention were substantially fast, while samples otherwise as prepared above were noticeably changed and could be easily distinguished by these tests from the materials made in accordance with this invention.

It will be understood that other esterified vat dyestuffs than those mentioned in the examples, can be used. It will also be understood that other pyridine bases, various other solutions of phenols and various other esters of glycerine than those set forth may be employed.

Thus while I have described my improvements in detail and with respect to certain preferred forms, I do not desire to be limited to such details or forms since, as will be noticed by those skilled in the art, after understanding my invention many changes and modifications may be made and the invention embodied in widely different forms without departing from the spirit and scope thereof in its broader aspects, and I desire to cover all modifications, forms and improvements coming within the scope of any one or more of the appended claims.

Having thus described my invention, what I claim as new and desire to secure by Letters Patent is:

1. A process of the kind described which comprises printing on animal fibers with a mixture including a water soluble esterified vat dyestuff, an agent for promoting the solution of the dyestuff in water selected from a group consisting of a pyridine base, an alcoholic solution of a phenol, and a solubilizing ester of glycerine, and a mild oxidizing agent, steaming the fibers and passing the printed fibers through a weak acid bath to fix the color on the fiber.

2. A process of the kind described which comprises printing on animal fibers with a mixture including a water soluble esterified vat dyestuff, a pyridine base for promoting the solution of the dyestuff in water, and nitrite, steaming with wet steam at about 99–100° C. and passing the printed fibers through a weak mineral acid bath to fix the color on the fiber.

3. A process according to claim 1 in which the dilute acid is heated.

4. A process according to claim 2 in which the mineral acid is dilute sulphuric acid heated to about 95° C. and the time of passing the fibers therethrough is about 2 minutes.

5. A process according to claim 1 in which a final oxidation is given to the fiber after passing the material through a weak acid bath.

6. A step in the process for printing animal fibers in which the animal fibers are printed with a mixture including a water soluble esterified vat dyestuff, an agent for promoting the solution of the dyestuff in water selected from a group consisting of a pyridine base, an alcoholic solution of a phenol and a solubilizing ester of glycerine.

7. The steps in a process for printing animal fibers consisting in printing the animal fibers with a mixture including a water soluble esterified vat dyestuff, an agent for promoting the solution of the dyestuff in water selected from a group consisting of a pyridine base, an alcoholic solution of a phenol and a solubilizing ester of glycerine, and passing the printed fibers through a weak acid bath to fix the color on the fiber.

JEAN GOTTLIEB KUNDERT.